Aug. 21, 1956 W. REITER 2,759,738
CABINET TYPE BEACH WAGON WITH WHEEL SUPPORTING TROUGH
Filed May 20, 1954 2 Sheets-Sheet 1
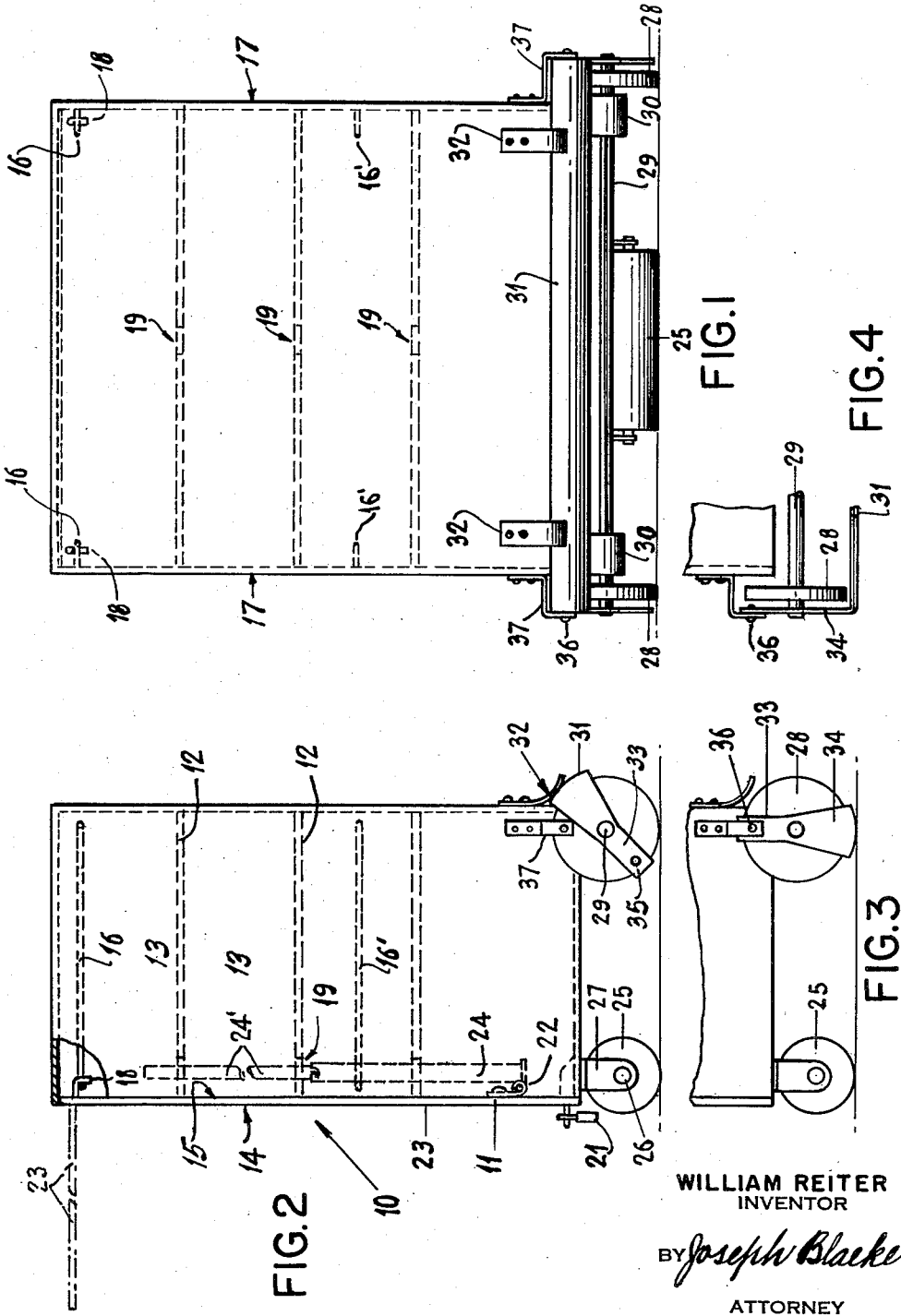
WILLIAM REITER
INVENTOR
BY Joseph Blacker
ATTORNEY United States Patent Office 2,759,738
Patented Aug. 21, 1956

2,759,738

CABINET TYPE BEACH WAGON WITH WHEEL SUPPORTING TROUGH

William Reiter, Brooklyn, N. Y.

Application May 20, 1954, Serial No. 431,083

3 Claims. (Cl. 280—62)

This invention relates to a cabinet-type beach wagon, mounted on axles on two narrow wheels and on one elongated roller, the roller serving to facilitate movement over sandy ground, the axle of the two narrow wheels having a supporting trough movable under the two narrow wheels to prevent sinking of the narrow wheels into the sand.

An object of this invention is to provide a beach wagon having an integral table and telescoping means for adjusting the table to selected elevations from the ground.

Another object of this invention is to provide a beach wagon having two wheels of narrow width mounted on an axle positioned below the base of the beach wagon, the narrow wheels being outside the end walls of the cabinet and being particularly adapted for movement over sidewalks or other hard and uneven surfaces, and to provide an elongated roller at the opposite side and at the bottom of the beach wagon and being particularly adapted for movement over soft and yielding sand, so as to avoid sinking of the beach wagon into the sand when the beach wagon is in a stationary position.

Another object of this invention is to provide the supporting trough with locking means to hold it rigid in a position clear of the ground when not in use.

Another object of this invention is to provide a lock for the supporting trough mounted on the axle of the narrow wheels and movable into locked ground engaging position when the beach wagon is in stationary service position.

It is found under operating conditions, that for movement on hard surfaces, the beach wagon requires narrow wheels for maneuvering or easy wheeling when passing over concrete roadways and sidewalks.

For use on soft sandy beaches, the beach wagon requires an elongated roller to provide a large contact area and thereby prevent sinking of the roller into the sand and this results in easy wheeling when passing over soft sandy beaches.

When the beach wagon is in a stationary upright position on a sandy beach, the trough is positioned under the narrow wheels and in contact with the sand and raises the narrow wheels above the sand and prevents the narrow wheels from sinking into the soft sand which would allow the sand to enter into the bearings and make them inoperable.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a rear elevation of the beach wagon.

Figure 2 is a side view of the beach wagon shown in Figure 1, partly broken away to show interior supports for a table.

Figure 3 is a side view of a fragmentary portion of the beach wagon and showing a trough in service position.

Figure 4 is a rear view of the fragmentary portion of the beach wagon shown in Figure 3.

Figure 5:
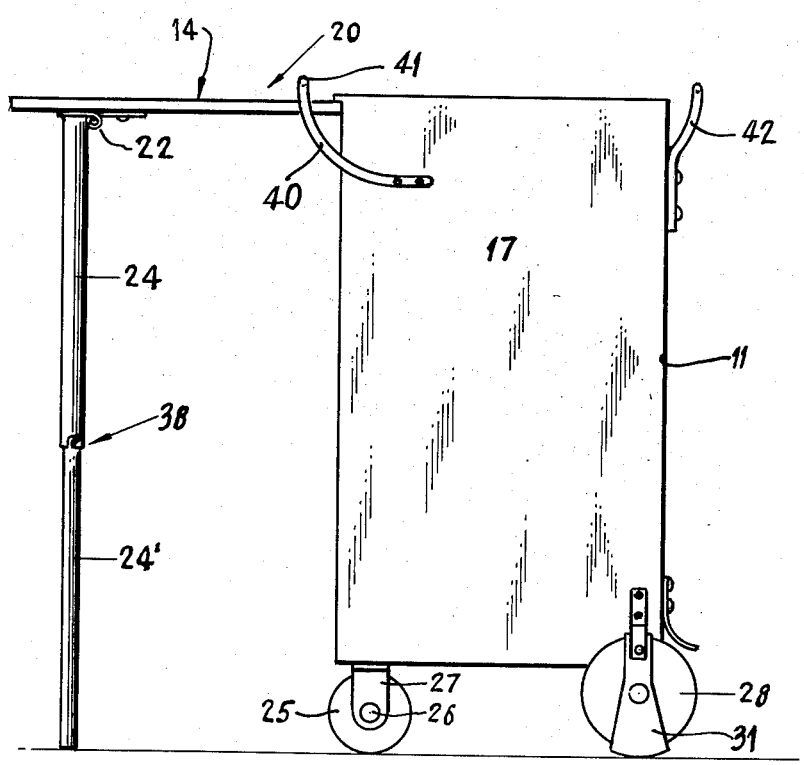
Figure 5 is a side view of the cabinet type beach wagon with the table in partly extended position to provide a snack bar, and shown supported on two telescopic tubes.

In the illustrated embodiment of the invention, the numeral 10 indicates a beach wagon comprising a cabinet 11 having shelves 12 providing compartments 13 for a radio, beach apparel, food supplies, etc.

A table 14 is provided and made of a size to cover the open front face 15 of the cabinet. The table is supported by two U-shaped tracks 16 secured inside the cabinet on the two end walls 17.

The table 14 has two hooks 18 secured thereto at its upper edge portion, rearwardly thereof. The hooks 18 are of right-angular form and engage the tracks 16 when the table or door 14 is in upright position as shown in Figure 2.

The upper front edge of the door or table 14 is rounded to permit swinging of the door horizontally into the cabinet, as shown in dot-and-dash lines.

In the said horizontal position, the door or table functions as a snack bar 20.

It is to be noted that an additional track 16', similar to the track 16 may be used to mount the table at a lower elevation. A lock 21 may be used to prevent unauthorized entry into the cabinet.

The table top 23 has foldable telescopic legs 24, 24' at its free end, the legs being foldable against the underside of the table. It is to be noted that openings 19 are provided in the central front portions of the shelves to provide room for the telescopic legs to enter. In operating position, when the table top 23 is swung about the transverse end portions of the tracks to horizontal position, the telescopic legs 24, 24' are set vertically and support the table top 23.

It is to be noted that the table top 23 may be removed from the upper tracks 16 and mounted on the lower tracks 16'. This makes it possible to provide a table at a lower elevation than the full height of the cabinet.

An elongated roller 25 is rollably mounted on the sand while rotatable on an axle 26 supported in brackets 27 at one of the sides and at the bottom of the cabinet 11. The elongated roller 25 is of a large diameter and length which makes the beach wagon supported on a large surface and thereby adaptable for movement over soft and yielding sand and materially assists in avoiding sinking of the beach wagon into the sand.

The cabinet 11 also has two narrow wheels 28 rollably mounted on the sand while rotatable on an axle 29. The axle 29 is supported in bearings 30 on the other side of the cabinet and at the bottom thereof.

The narrow wheels are mounted outside the end walls 17 of the cabinet and project outwardly beyond the rear wall.

In order to prevent the narrow wheels from sinking into the sand, I have provided an elongated trough 31 mounted on the axle 29 which carries the narrow wheels 28. As shown in Figure 1, the trough 31 is coextensive with the axle 29 and extends the entire distance between the wheels 28 and in partial covering relation with the wheels. The trough is of arcuate form and is swingable about the axle 29 below the narrow wheels 28 into contact with the sand and serves to appreciably raise the narrow wheels and the cabinet above the sand and prevents the narrow wheels from sinking into the sand.

It is to be noted that two leaf springs 32 may be fixed to one side of the cabinet 11 and of a form to engage the outer peripheral surface of the trough 31 and hold the trough when in inoperative position.

As shown in Figure 3, I have provided an extension 33 to each end wall 34 of the trough 31. The free end of the extension 33 has an aperture 35 which serves for receiving a pin 36 in a spring arm 37 to lock the trough in service position in such a manner that a push against a side wall of the cabinet will not disengage the trough from operating position.

As shown in Figure 5, the table 14 is shown extended from the cabinet 11 and supported on two telescopic tubes 24 and 24'. The tubes are pivotally secured to the table top by a hinge 22. A bayonet joint 38, well known in the art, is employed for extending the tubes into operating position.

As shown in Figure 5, I have provided a handle 40 which is suitably secured to both end walls 17 and has its upper portion 41 horizontally disposed and extending lengthwise of the beach wagon to the opposite end wall. The horizontal upper portion 41 serves as a towel rack. The handle 40 serves as a pulling handle for the side on which the elongated roller is mounted.

I also provide a further handle 42, similar to the handle 40. The handle 42 serves as a pulling handle for the side on which the two narrow wheels are mounted and can also be used as a towel rack.

In accordance with the patent statutes, I have described and illustrated the preferred embodiment of my invention, but it will be understood that various changes and modifications can be made therein without departing from the spirit of the invention as defined by the appended claims.

I claim:

1. In combination with a beach wagon having an upright cabinet, an elongated roller rotatably mounted at one of the sides and at the bottom of said cabinet and being adaptable for movement over soft and yielding sand so as to avoid sinking of said wagon into the sand, said beach wagon having two narrow wheels rotatably mounted on an axle on the other side and at the bottom of said beach wagon, and an elongated trough mounted on the axle carrying said narrow wheels and movable into contact with the sand said trough being coextensive with said axle and extending in partial covering relation with both said narrow wheels, said trough serving to raise said narrow wheels above the sand to prevent said narrow wheels from sinking into the sand.

2. In combination with a beach wagon having an upright cabinet, an elongated roller rotatably mounted at one of the sides and at the bottom of said cabinet and being adaptable for movement over soft and yielding sand so as to avoid sinking of said wagon into the sand, said beach wagon having two narrow wheels rotatably mounted on an axle on the other side and at the bottom of said beach wagon, an elongated trough mounted on the axle carrying said narrow wheels and movable into contact with the sand said trough being coextensive with said axle and extending in partial covering relation with both said narrow wheels, said trough serving to raise said narrow wheels above the sand to prevent said narrow wheels from sinking into the sand, and means for locking said trough in ground engaging position and under said narrow wheels.

3. A portable article of furniture for beach use, comprising an upright housing, two wheels and an elongated roller, said roller being elongated to support the weight of said article with a minimum of sinking into the sand, the remainder wheels being of narrow width to permit maneuverability of said article over hard ground to the point of usage, an elongated trough mounted on the axle carrying said wheels and movable into contact with the sand, said trough being coextensive with said axle and extending in partial covering relation with both said wheels, said trough serving to raise said wheels above the sand to prevent said wheels from sinking into the sand and means for locking said trough in ground engaging position under said wheels.

References Cited in the file of this patent

UNITED STATES PATENTS

| | | |
|---|---|---|
| 950,545 | Taubert | Mar. 1, 1910 |
| 1,299,313 | Elrod | Apr. 1, 1917 |
| 2,192,337 | Tiffany | Mar. 5, 1940 |
| 2,499,062 | Greenberg | Feb. 28, 1950 |
| 2,666,679 | Olofsson | Jan. 17, 1954 |

FOREIGN PATENTS

| | | |
|---|---|---|
| 949,315 | France | Feb. 14, 1949 |